(12) United States Patent
Chmura

(10) Patent No.: US 11,502,496 B2
(45) Date of Patent: Nov. 15, 2022

(54) CABLE JOINT ASSEMBLY

(71) Applicant: LEIA B.V., Terborg (NL)

(72) Inventor: Lukasz Andrzej Chmura, Arnhem (NL)

(73) Assignee: LEIA B.V., Terborg (NL)

(*) Notice: Subject to any disclaimer, the term of this patent is extended or adjusted under 35 U.S.C. 154(b) by 30 days.

(21) Appl. No.: 17/094,108

(22) Filed: Nov. 10, 2020

(65) Prior Publication Data

US 2021/0143626 A1 May 13, 2021

(30) Foreign Application Priority Data

Nov. 12, 2019 (NL) ................................ 2024222

(51) Int. Cl.
*H02G 15/08* (2006.01)
*H02G 15/00* (2006.01)

(52) U.S. Cl.
CPC .......... *H02G 15/003* (2013.01); *H02G 15/08* (2013.01)

(58) Field of Classification Search
CPC ............................. H02G 15/003; H02G 15/08
USPC ...................................................... 174/84 R
See application file for complete search history.

(56) References Cited

U.S. PATENT DOCUMENTS

| | | | | | |
|---|---|---|---|---|---|
| 1,585,125 A | * | 5/1926 | Simons | ................ | H02G 15/188 174/21 R |
| 1,693,365 A | * | 11/1928 | Boyle | ...................... | H02G 1/14 174/21 JS |
| 3,951,712 A | * | 4/1976 | Nakata | ..................... | H02G 1/14 156/48 |
| 5,251,373 A | * | 10/1993 | DeCarlo | .................. | H02G 1/14 156/48 |
| 5,432,302 A | * | 7/1995 | Abdow | .................. | H02G 15/18 174/84 R |
| 7,723,611 B2 | * | 5/2010 | Stagi | ...................... | H01R 13/53 174/15.1 |
| 2006/0231283 A1 | * | 10/2006 | Stagi | ...................... | H01R 13/53 174/84 R |
| 2009/0246995 A1 | * | 10/2009 | Stagi | ...................... | H02G 15/24 439/201 |
| 2011/0100671 A1 | * | 5/2011 | Seraj | ........................ | H02G 1/14 29/592 |

FOREIGN PATENT DOCUMENTS

| | | |
|---|---|---|
| EP | 0955713 | 11/1999 |
| FR | 2301119 | 9/1976 |
| GB | 1505259 | 3/1978 |
| WO | 2007112230 | 10/2007 |

* cited by examiner

*Primary Examiner* — Timothy J Thompson
*Assistant Examiner* — Michael F McAllister
(74) *Attorney, Agent, or Firm* — Marcus C. Dawes

(57) ABSTRACT

A cable joint assembly and a method for assembling such a cable joint assembly. The cable joint assembly joins at least two cable ends, said cable joint assembly comprising a cable joint defining an interior space into which in use said at least two cable ends extend and are joined and which in use is filled with a liquid, wherein said cable joint assembly further comprises a barrier element that is placeable in said interior space in such a manner, that in use the barrier element extends around the at least two cable ends at least in an area where the at least two cable ends are joined.

18 Claims, 3 Drawing Sheets

CABLE JOINT ASSEMBLY

BACKGROUND

Field of the Technology

The invention relates to a cable joint assembly for joining at least two cable ends, said cable joint assembly comprising a cable joint defining an interior space into which in use said at least two cable ends extend and are joined and which in use is filled with a liquid.

Description of the Prior Art

Such a cable joint assembly is known per se. Said cable joint may be grounded. Said cable joint may for example comprise two interconnectable shells, such that prior to connecting the shells the interior space is accessible for joining the at least two cable ends and wherein the shells may be connected to each other after joining the cable ends. A closeable liquid supply opening may be provided for filling the cable joint with said liquid. Said liquid may be provided for preventing or at least reducing the probability of a (partial) discharge, i.e. a localized dielectric breakdown or flashover. Said liquid may be any suitable liquid, such as oil or a silicone based liquid.

BRIEF SUMMARY

It is an object of the invention to improve said known cable joint assembly. More in particular, it may be an object of the invention to reduce the probability of a partial discharge, which could possibly damage the cable ends and/or the cable joint assembly.

This object is met by a cable joint assembly according to the preamble, that is characterized by further comprising a barrier element that is placeable in said interior space in such a manner, that in use the barrier element extends around the at least two cable ends at least in an area where the at least two cable ends are joined.

Said barrier element may prevent or reduce the line-up of impurities in the liquid, such as solids or bubbles. A line-up of impurities is thought to increase the probability of a partial discharge, by providing a breakdown path of relatively low electrical resistance along which the partial discharge may take place. Thus, by preventing or reducing the line-up of impurities, the barrier reduces the probability of a breakdown, and therefore of a partial discharge, which otherwise could cause damage. Additionally or alternatively, the barrier may increase the length of a breakdown path along which a partial discharge may take place, because the breakdown will usually not intersect the barrier element, but will follow a path through the liquid defined by the barrier element. Increasing the length of the breakdown path may reduce the probability of a breakdown, and therefore the probability of a partial discharge causing damage.

The probability of a partial discharge determines to some extend the required distance between the cable ends and the cable joint. The cable joint is designed to be sufficiently large to provide a probability of partial discharge that is desirably low. By using the barrier element according to the invention, the probability of partial discharge or flashover may be lowered. Accordingly, the cable joint can be made smaller, whilst providing the same desirably low probability of discharge. This results in a less costly cable joint, and lower installation and production costs.

Said area where the at least two cable ends are joined may at least comprise the area where the outer end zones of the cables are present, more in particular the end zones where the electrical conductors of the cables are exposed and not covered by a sheath. Said outer end zones may be joined by a connector. Said area may also be the area where at least the connector is present.

In particular, the barrier element may be longitudinal in shape. The length of the barrier element, measured in the length direction of the cable ends, may for example be larger than 10 cm, larger than 15 cm or larger than 20 cm.

Said cable joint assembly may comprise grounded stress cones, sometimes referred to as deflectors or field steering elements. Said barrier element is preferably not present in the area of the stress cones, and even more preferably spaced apart from the stress cones in an axial direction of the cable joint assembly by a minimum spacing distance, said minimum spacing distance being for example 2 cm.

Preferably, the barrier is spaced apart from the cable ends and from the cable joint, so that liquid may take place between the barrier and the cable ends, and between the barrier and the cable joint. Particular, the presence of liquid between these elements may eliminate the presence of air or air bubbles.

In an embodiment of the cable joint assembly according to the invention said barrier element defines at least one partition that in use parts the liquid as seen in a direction radially outwards from said cable ends in said area, in particular at any angular position around said at least two cable ends.

In other words, starting from the cable ends at any angular position and as seen in an outward radial direction towards the shells of the cable joint, a partition is present at a, but not necessarily the same, radial position.

The barrier element may have a roughly cylindrical outer shape.

One or both longitudinal ends of the barrier element may be open, so that liquid can flow around and into the barrier elements.

By parting the liquid in the radially outward direction, the relatively short breakdown path in the radially outward direction is blocked by the barrier, because a partial discharge will normally not intersect the partition.

By providing a said partition at any angular position around said at least two cable ends, there is no angular position where the breakdown path may directly reach the outer shell of the cable joint assembly in the radial direction.

Preferably said barrier element defines multiple partitions, said partitions being spaced apart in said radial direction.

Providing multiple partitions that are spaced apart in said radial direction provides the advantage of providing multiple locations as seen in the radially outward direction with respect to the cable ends where the breakdown will not intersect. Accordingly, the breakdown path may go around the partitions.

For example, starting at any angular position around the cable ends and going radially outwards in the direction of the shell, minimally one, but preferably two, even more preferably three partitions are present prior to reaching the shell. Between each partition and preferably between the outermost partition and the shell, may be a radial interspace.

The barrier may be open on one or both of its longitudinal ends, so that liquid may enter the interspace between the barrier and the cable ends and/or between the barrier and the cable joint and/or between the multiple partitions, to eliminate the presence of air and/or air bubbles.

Practically said multiple partitions are connected or connectable to each other via bridge parts, said bridge parts for example extending in a substantially radial direction.

Said bridge parts may connect the multiple partitions at a desired spacing from each other in the radial direction.

A said bridge part may be permanently connected to, i.e. an integral part of, a first partition, and may be connectable to a further partition, for connecting the first partition to a further partition.

Alternatively or additionally a said bridge part may be permanently connected, i.e. an integral part, of two partitions, that are permanently connected to each other by said bridge part, such that the two partitions are one integral part.

Alternatively or additionally a said bridge part may be provided as a separate element that is connectable to two partitions.

Practically said barrier element comprises multiple barrier parts that are interconnectable by means of mutually cooperating connecting means.

Said multiple barrier parts may define at least a portion of one or more partitions.

Forming said barrier element out of multiple barrier parts provides the advantage of easy placement of the barrier around the cable ends. This may in particular be the case if each barrier part defines a non-closed contour as seen in a transverse cross section of the respective barrier part, thereby allowing said barrier part to be placed around the at least two cable ends and optionally around other parts of the cable joint assembly, such as the connector.

The multiple barrier parts may in particular be slightly flexible and/or elastically deformable, such that an opening of a said barrier part defined by the non-closed contour can be temporarily increased in size by temporarily deforming said barrier part, in particular by bending legs of said part that lie adjacent to said opening, in a direction away from each other. After placing a said barrier part around the at least two cable ends and optionally around other parts of the cable joint said barrier part may return to its original shape, e.g. elastically.

By providing multiple of said barrier parts it may be assured that in each radially outward direction starting at any angular position around the two cable ends, a barrier part is present and thereby a said partition is present.

Said connecting means may be provided in any desired manner.

For example, said connecting means may comprise a receiving space and an extension that can be received in said receiving space. More in particular, an extension of a first barrier part may be received in the receiving space of a further barrier part, thereby connecting this first and further barrier parts.

Said receiving space may be defined by flexible legs and said extension may comprise an end zone having a larger transverse cross sectional dimension than a part of the extension connecting to said end zone, wherein the flexible legs are able to move away from each other upon insertion of the end zone of the extension and to move back after insertion of the end zone.

An advantage thereof is that said extension may be hold by said receiving space with a relatively large holding force.

Said above described bridge parts may optionally form part of the connecting means. More in particular said above described bridge parts may form the extension of the connecting means.

In yet another embodiment of the cable joint assembly according to the invention said barrier element comprises at least one of a substantially radially inward and outward extending spacer, respectively for spacing the barrier element from the at least two cable ends and from a circumferential wall of the cable joint.

Providing a said substantially radially inward spacer spaces the barrier element at a distance from the cable ends. An advantage thereof is that it may be assured, or at least increase the chance, that liquid is present between the cable ends and the barrier element.

Providing a said substantially radially outward spacer spaces the barrier element at a distance from the circumferential wall of the cable joint, i.e. of the shells. An advantage thereof is that it may be assured, or at least increase the chance, that liquid is present between the barrier element and the shells.

It is noted that both the inward and outward extending type of spacers may be provided, but also only one of these types of spacers may be provided. Depending on for example the shape and/or size of the barrier element it may be sufficient to provide only one type of these spacers.

Said barrier element may be made of an electrically non-conductive material, such as a plastic.

Said plastic may be any suitable plastic, preferably chosen for its high insulating properties.

For example, said plastic may be polyethylene or polypropylene.

The invention also relates to a barrier element, suitable and intended to be used for a cable joint assembly as described above in any of the described embodiments and/or having any one or more of the above described features, alone or in any suitable combination. For a description of the features and/or advantages of the barrier element, a reference is also made to the description above relating to the cable joint assembly.

As described above, said barrier element may define at least one partition that in use parts the liquid as seen in a direction radially outwards from said cable ends in said area, in particular at any angular position around said at least two cable ends.

As described above, said barrier element may define multiple partitions, said partitions being spaced apart in said radial direction.

Said multiple partitions may be connected or connectable to each other via bridge parts, said bridge parts for example extending in a substantially radial direction.

Said barrier element may comprise multiple barrier parts that are interconnectable by means of mutually cooperating connecting means.

Each barrier part may define a non-closed contour as seen in a transverse cross section, thereby allowing said part to be placed around the at least two cable ends and optionally around other parts.

Said connecting means may comprise a receiving space and an extension that can be received in said receiving space.

Said receiving space may be defined by flexible legs and said extension comprises an end zone having a larger transverse cross sectional dimension than a part of the extension connecting to said end zone, wherein the flexible legs are able to move away from each other upon insertion of the end zone of the extension and to move back after insertion of the end zone.

Said barrier element may comprise at least one of a substantially radially inward and outward extending spacer, respectively for spacing the barrier element from the at least two cable ends and from a circumferential wall of the cable joint.

Said barrier element is made of an electrically non-conductive material, such as a plastic.

The invention also relates to a method for assembling a cable joint assembly as described above in any of the described embodiments and/or having any one or more of the above described features, alone or in any suitable combination, comprising the steps, to be performed in any suitable order, of:

a) providing said cable joint assembly;

b) inserting at least two cable ends in the interior space of said cable joint and joining said at least two cable ends;

c) placing the barrier element in said interior space of the cable joint in such a manner, that the barrier element extends around the least two cable ends at least in an area where the at least two cable ends are joined, and d) filling said interior space with said liquid.

Practically in step a) a cable joint having for example two shells may be provided, wherein in steps b) and c) the cable ends and the barrier element are arranged in the interior space of for example one of the for example two shells, and wherein the for example two shells are connected to each other in a step f), which step f) is to be performed prior to step d).

In an embodiment of the method according to the invention is a cable joint assembly according to at least claim 5 provided in step a), and wherein in step c) barrier parts of said barrier element are connected to each other by means of said mutually cooperating connecting means.

In another embodiment of the method according to the invention is a cable joint assembly according to at least claim 6 provided in step a), and wherein in step c) each barrier part is placed around the at least two cable ends and optionally around other parts.

Placing each part around the at least two cable ends and optionally around other parts may involve bending a said part in an outward direction, wherein said part may return to its original shape after being placed around the at least two cable ends and optionally around other parts as a result of the part being elastically deformable.

BRIEF DESCRIPTION OF THE DRAWINGS

The invention will be further elucidated with reference to figures, wherein.

In the figures same elements are denoted by same reference numerals, increased by 100 for the second embodiment of the barrier element of FIG. 3.

DETAILED DESCRIPTION OF THE PREFERRED EMBODIMENTS

Figure 1:
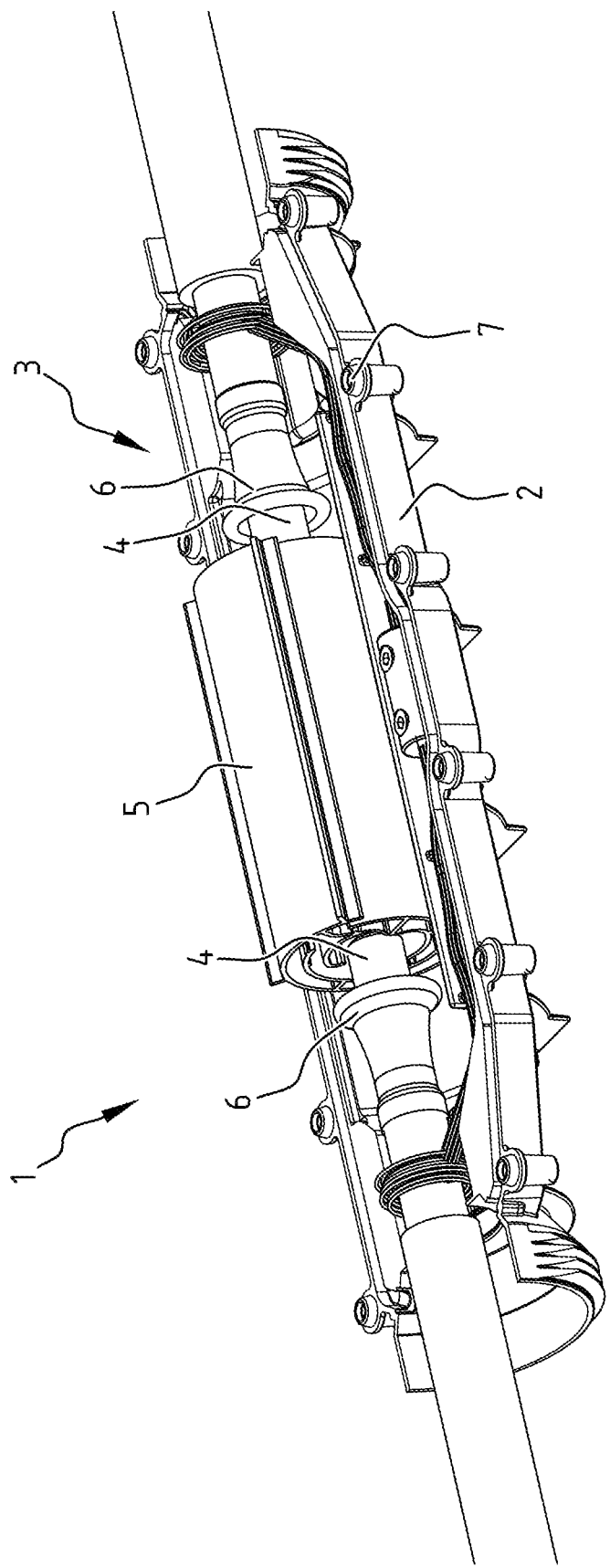
FIG. 1 schematically shows a cable joint assembly according to an embodiment of the invention in a perspective view.

FIG. 1 shows a cable joint assembly 1. Said cable joint assembly may for example be similar to the cable joint described in WO2019/112433. Only the features that are relevant for understanding the current invention are described here. For a further description of the cable joint reference is made here to WO2019/112433, which is hereby incorporated by reference in its entirety.

The cable joint assembly 1 comprises in this exemplary embodiment a first shell 2 defining part of an interior space 3. In the interior space 3 two cable ends 4 extend and are joined. In the area where the two cable ends 4 are joined a barrier element 5 is provided that extends around the two cable ends 4 at least in said area where the at least two cable ends are joined. The barrier element 5 is substantially cylindrical in shape, and has open ends to allow liquid to enter between the cable ends 4 and the barrier element 5 and around the barrier element 5. Grounded stress cones 6 extend around the cable ends 4 at a distance from the area where the cable ends 4 are joined. Said barrier element 5 is spaced apart from the stress cones 6 by an axial distance defined in the axial direction of the cable joint assembly 1, which is parallel to the axial direction of the cable ends 4. After joining the cable ends 4 and after inserting the barrier element 5 in the interior space 3, a second shell may connect to the first shell 2 via the connector elements 7. A liquid supply opening (not shown) is provided in either the first shell or the second shell, such that the interior space 3 can be filled with a liquid via said liquid supply opening. After filing the interior space 3 with liquid, the liquid supply opening may be closed. Since the barrier element 5 is open at its longitudinal ends, liquid is distributed between the barrier element 5 and the cable ends 4, between the barrier element 5 and the shell 2 and in between partitions of the barrier element 5 introduced below.

Figure 2:
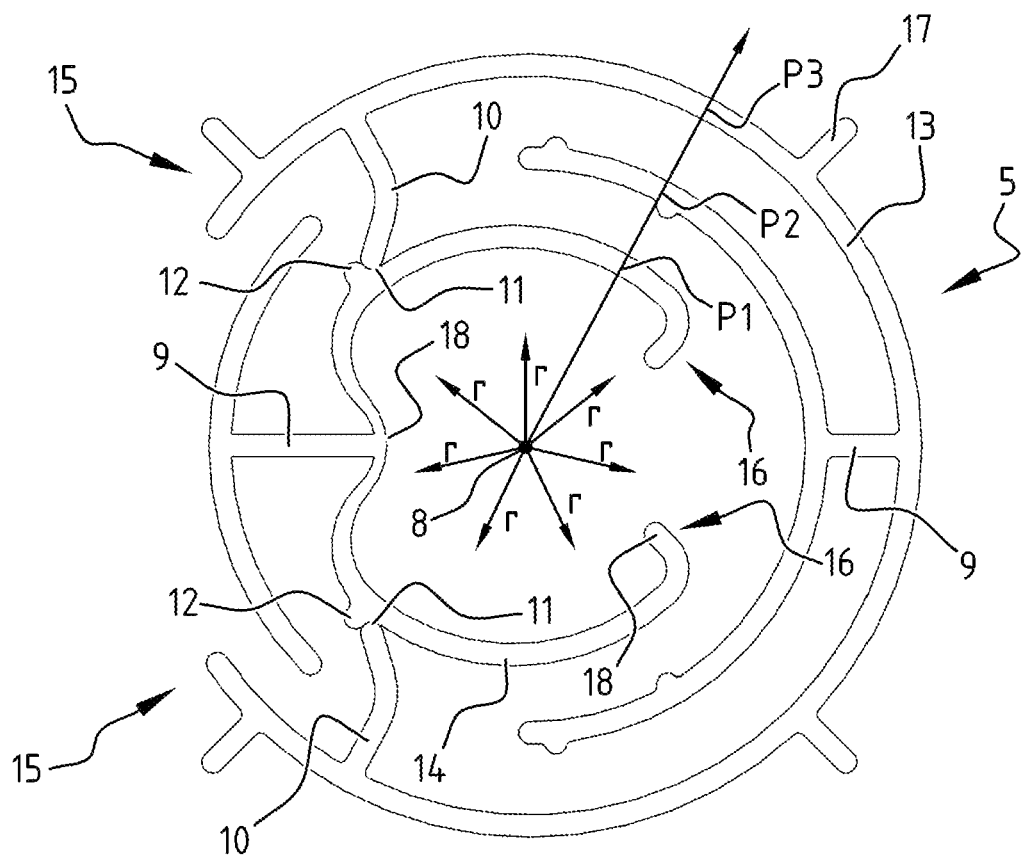
FIG. 2 schematically shows a barrier element of the cable joint assembly of FIG. 1 in more detail in a transverse cross-sectional view, and FIG. 3 schematically shows a barrier element according to a second embodiment of the invention in a transverse cross-sectional view.

FIG. 2 shows the barrier element 5 of FIG. 1 in a transverse cross-sectional view. For the sake of simplicity the cable ends 4 are not shown in FIG. 2, but it will be clear for the skilled person that they are arranged substantially in the center 8 of the barrier element. This figure shows that in any direction radially outwards starting from the center 8 of the barrier element 5, denoted by arrows r, said barrier element 5 defines at least one partition, and in this embodiment two or three partitions dependent on the angular position, wherein each partition parts the liquid as seen in the direction r radially outwards. To explain this more clearly, one exemplary radial direction r is shown over the full length of the radius of the barrier element 5, thereby showing three partitions $P_1$, $P_2$, $P_3$ at that specific angular position. The two or three partitions are connected or connectable to each other via bridge parts 9, 10, respectively. The bridge parts 9 are an integral part of the partitions between which they extend, such that they permanently connect these partitions. The bridge parts 10 are an integral part of one partition, and connectable to a further partition, by receiving the bridge parts 10 in a receiving space 11 of the further partition. The receiving space 11 is in this embodiment defined by an extension 12 protruding from the further partition and the further partition itself. In this embodiment, the partitions are comprised by two barrier parts 13, 14 of the barrier element 5, which are interconnected by said bridge parts 10 and the receiving spaces 11. Each barrier part 13, 14 has a non-closed contour as seen in this transverse cross section of FIG. 2, thereby allowing said barrier part 13, 14 to be placed around the at least two cable ends and barrier part 14 to be placed around barrier part 13. The free ends 15, 16 of the barrier parts 13, 14, which define the non-closed part of the contour, can be bend slightly outwards for placing the barrier parts 13, 14 around the cable ends and are able return to their original position after being placed around the cable ends, i.e. the barrier parts 13, 14 are elastically deformable. One barrier part 14 of this embodiment further comprises a plurality of inward extending spacers 18 for spacing the barrier part 14 from the cable ends. The other barrier part 13 of this embodiment further comprises a plurality of outward extending spacers 17 for spacing the part 14 from the shells 2. Said barrier element 5 of this embodiment is made of an electrically non-conductive material, such as a plastic.

Figure 3:
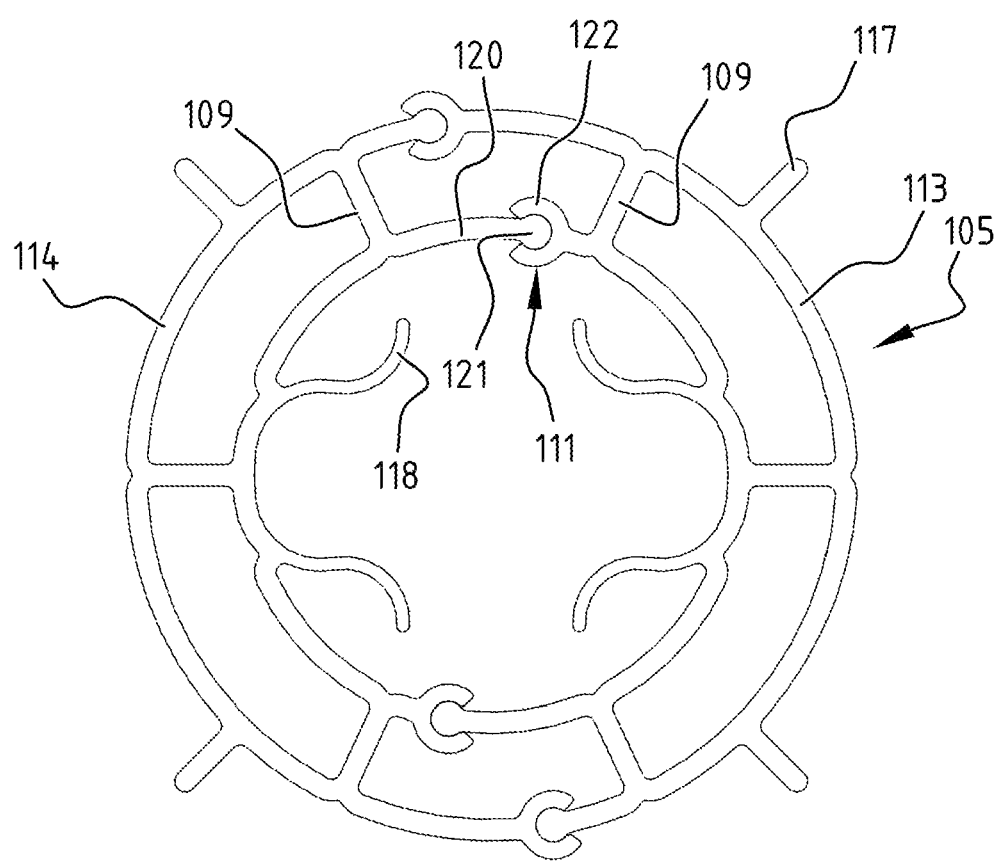

FIG. 3 shows a barrier element 105 according to a second embodiment of the invention in a transverse cross-sectional view. Only the differences with respect to the barrier element 5 of FIGS. 1 and 2 will be described here. For a further description the reader is referred to the description of FIGS. 1 and 2.

The barrier element 105 comprises two barrier parts 113, 114, each having substantially the shape of half a double walled cylinder. The two barrier parts 113, 114 define two partitions, which partitions are connected to each other via bridge parts 109. The barrier parts 113, 114 are not connected to each other via any of said bridge parts, but via connecting means in the form of receiving spaces 111 and extensions 120. Said receiving space 111 is defined by flexible legs 122 and said extension 120 comprises an end zone 121 having a larger transverse cross sectional dimension than a part of the extension 120 connecting to said end zone, wherein the flexible legs 122 are able to move away from each other upon insertion of the end zone 121 of the extension 120 and to move back after insertion of the end zone 121. As a result of the shape of the barrier parts 113, 114, the barrier parts 113, 114 of the second embodiment do not necessarily have to be elastically deformable, because they may easily be placed around the cable ends.

It is noted that the invention is not limited to the shown embodiments but also extends to variants within the scope of the appended claims.

The invention claimed is:

1. Cable joint assembly for joining at least two cable ends, said cable joint assembly comprising a cable joint defining an interior space into which in use said at least two cable ends extend and are joined and which in use is filled with a liquid, characterized in that said cable joint assembly further comprises a barrier element that is placeable in said interior space in such a manner, that in use the barrier element extends around the at least two cable ends at least in an area where the at least two cable ends are joined,
wherein said barrier element defines at least one partition that in use parts the liquid as seen in a direction radially outwards from said cable ends in said area at any angular position around said at least two cable ends.

2. Cable joint assembly according to claim 1, wherein said barrier element defines multiple partitions, said partitions being spaced apart in said radial direction.

3. Cable joint assembly according to claim 2, wherein said multiple partitions are connected or connectable to each other via bridge parts, said bridge parts for example extending in a substantially radial direction.

4. Cable joint assembly according to claim 1, wherein said barrier element comprises multiple barrier parts that are interconnectable by means of mutually cooperating connecting means, wherein optionally each barrier part defines a non-closed contour as seen in a transverse cross section, thereby allowing said barrier part to be placed around the at least two cable ends and optionally around other parts.

5. Cable joint assembly according to claim 4, wherein said connecting means comprise a receiving space and an extension that can be received in said receiving space.

6. Cable joint according to claim 5, wherein said receiving space is defined by flexible legs and said extension comprises an end zone having a larger transverse cross sectional dimension than a part of the extension connecting to said end zone, wherein the flexible legs are able to move away from each other upon insertion of the end zone of the extension and to move back after insertion of the end zone.

7. Cable joint assembly according to claim 1, wherein said barrier element comprises at least one of a substantially radially inward and outward extending spacer, respectively for spacing the barrier element from the at least two cable ends and from a circumferential wall of the cable joint.

8. Cable joint assembly according to claim 1, wherein said barrier element is made of an electrically non-conductive material, such as a plastic.

9. Barrier element, suitable and intended to be used for a cable joint assembly according to claim 1, wherein optionally said barrier element is made of an electrically non-conductive material, such as a plastic,
wherein said barrier element defines at least one partition that in use parts the liquid as seen in a direction radially outwards from said cable ends in said area at any angular position around said at least two cable ends.

10. Barrier element according to claim 9, wherein said barrier element defines multiple partitions, said partitions being spaced apart in said radial direction.

11. Barrier element according to claim 10, wherein said multiple partitions are connected or connectable to each other via bridge parts, said bridge parts for example extending in a substantially radial direction.

12. Barrier element according to claim 9, wherein said barrier element comprises multiple barrier parts that are interconnectable by means of mutually cooperating connecting means, wherein optionally each barrier part defines a non-closed contour as seen in a transverse cross section, thereby allowing said barrier part to be placed around the at least two cable ends and optionally around other parts.

13. Barrier element according to claim 12, wherein said connecting means comprise a receiving space and an extension that can be received in said receiving space.

14. Barrier element according to claim 13, wherein said receiving space is defined by flexible legs and said extension comprises an end zone having a larger transverse cross sectional dimension than a part of the extension connecting to said end zone, wherein the flexible legs are able to move away from each other upon insertion of the end zone of the extension and to move back after insertion of the end zone.

15. Barrier element according to claim 9, wherein said barrier element comprises at least one of a substantially radially inward and outward extending spacer, respectively for spacing the barrier element from the at least two cable ends and from a circumferential wall of the cable joint.

16. Method for assembling a cable joint assembly according to claim 1, comprising the steps, to be performed in any suitable order, of:
a) providing said cable joint assembly according to claim 1;
b) inserting said at least two cable ends in the interior space of said cable joint and joining said at least two cable ends;
c) placing said barrier element in said interior space of the cable joint in such a manner, that the barrier element extends around the least two cable ends at least in an area where the at least two cable ends are joined, and
d) filling said interior space with said liquid.

17. Method according to claim 16, wherein in step a) a cable joint assembly according to at least claim 5 is provided, and wherein in step c) barrier parts of said barrier element are connected to each other by means of said mutually cooperating connecting means.

18. Method according to claim 17, wherein in step a) a cable joint assembly according to at least claim 5 is provided, and wherein in step c) each barrier part is placed around the at least two cable ends and optionally around other parts of the cable joint.

\* \* \* \* \*